Sept. 22, 1964    D. B. CALDWELL ETAL    3,149,516

MACHINE WITH GUIDE MEANS FOR PRODUCT

Filed April 22, 1960            9 Sheets-Sheet 1

INVENTOR

DEANE BALDWIN CALDWELL
HARRY KUNKLE HERR

BY *Glenn and Jackson*

ATTORNEYS

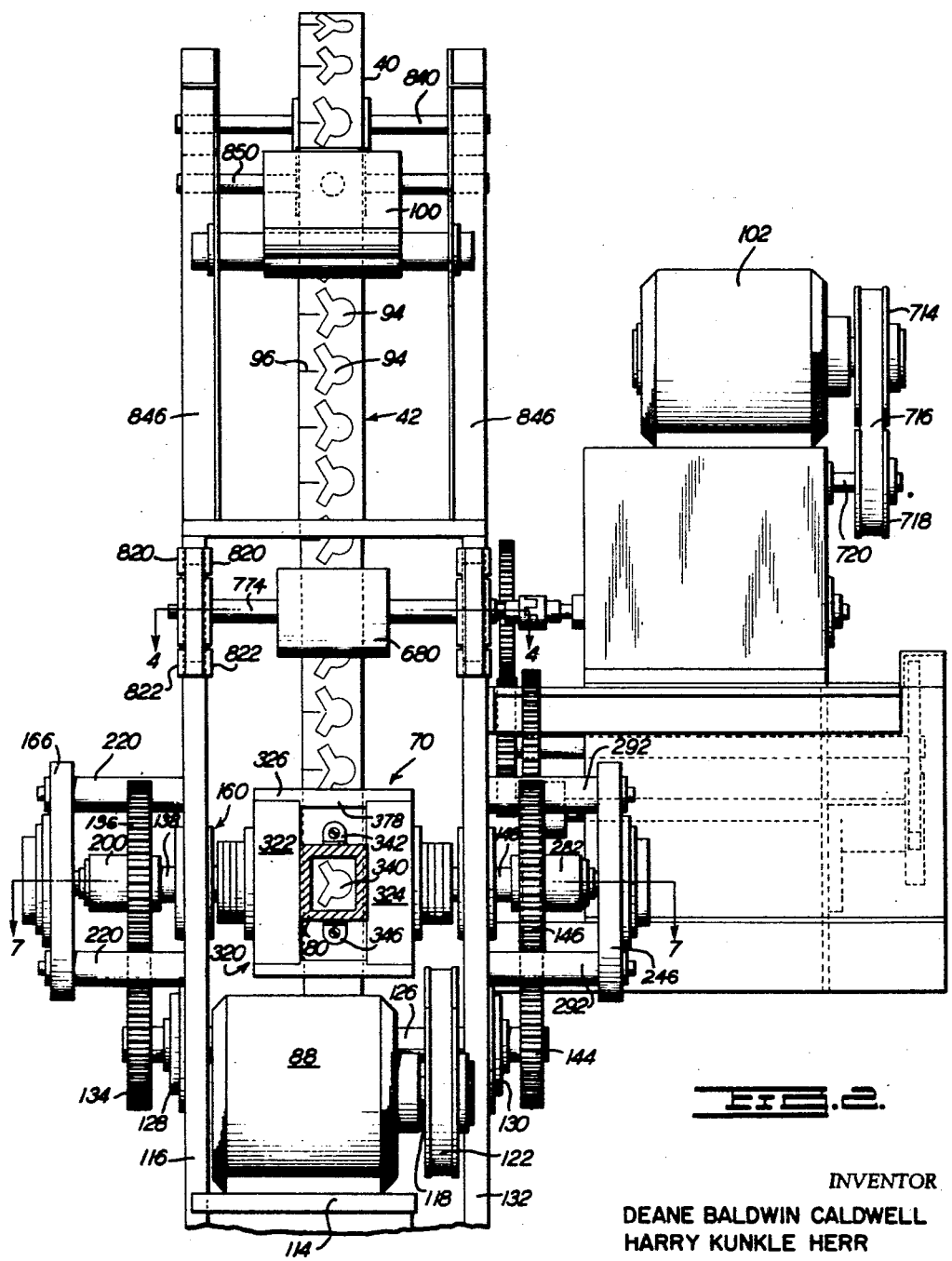

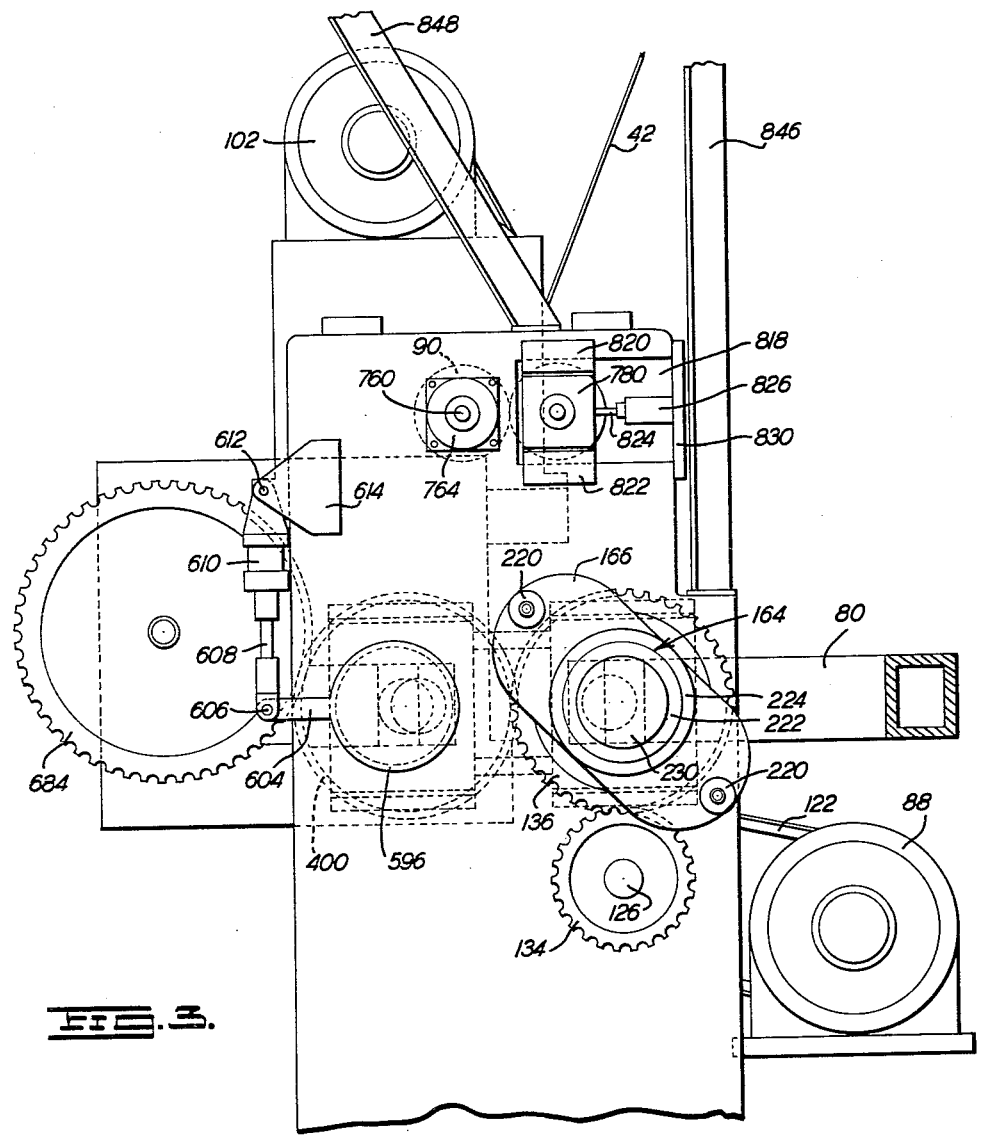

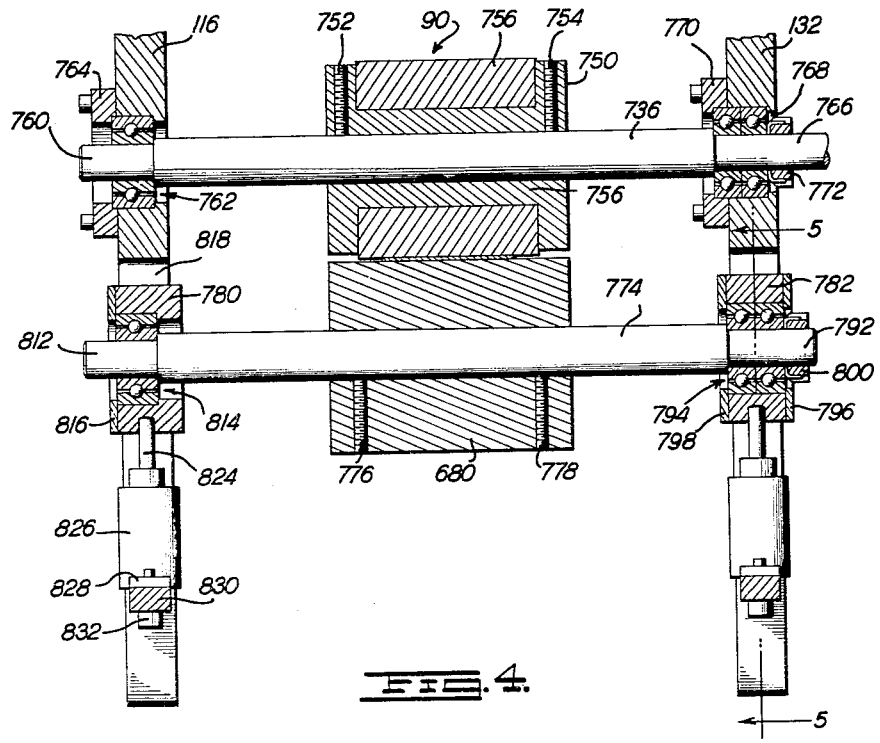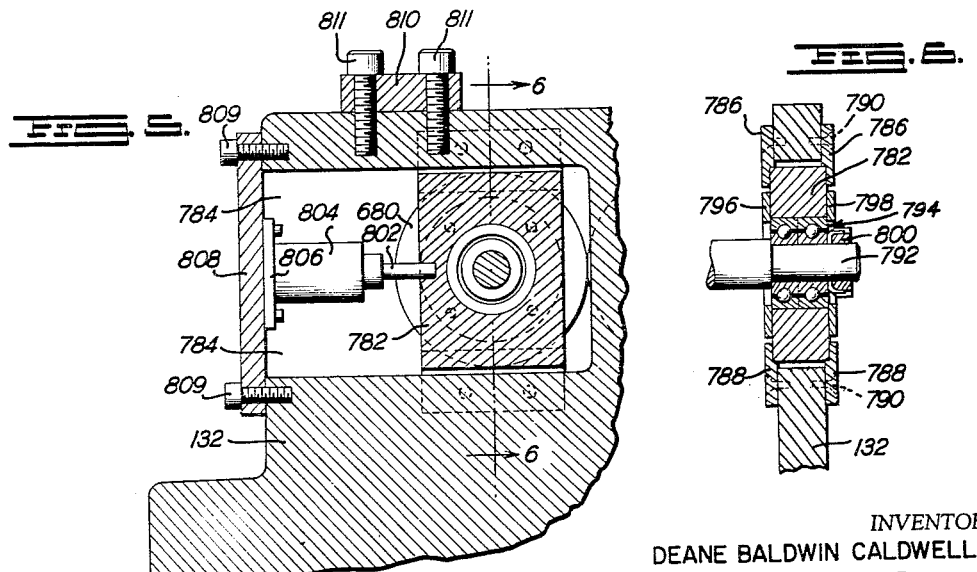

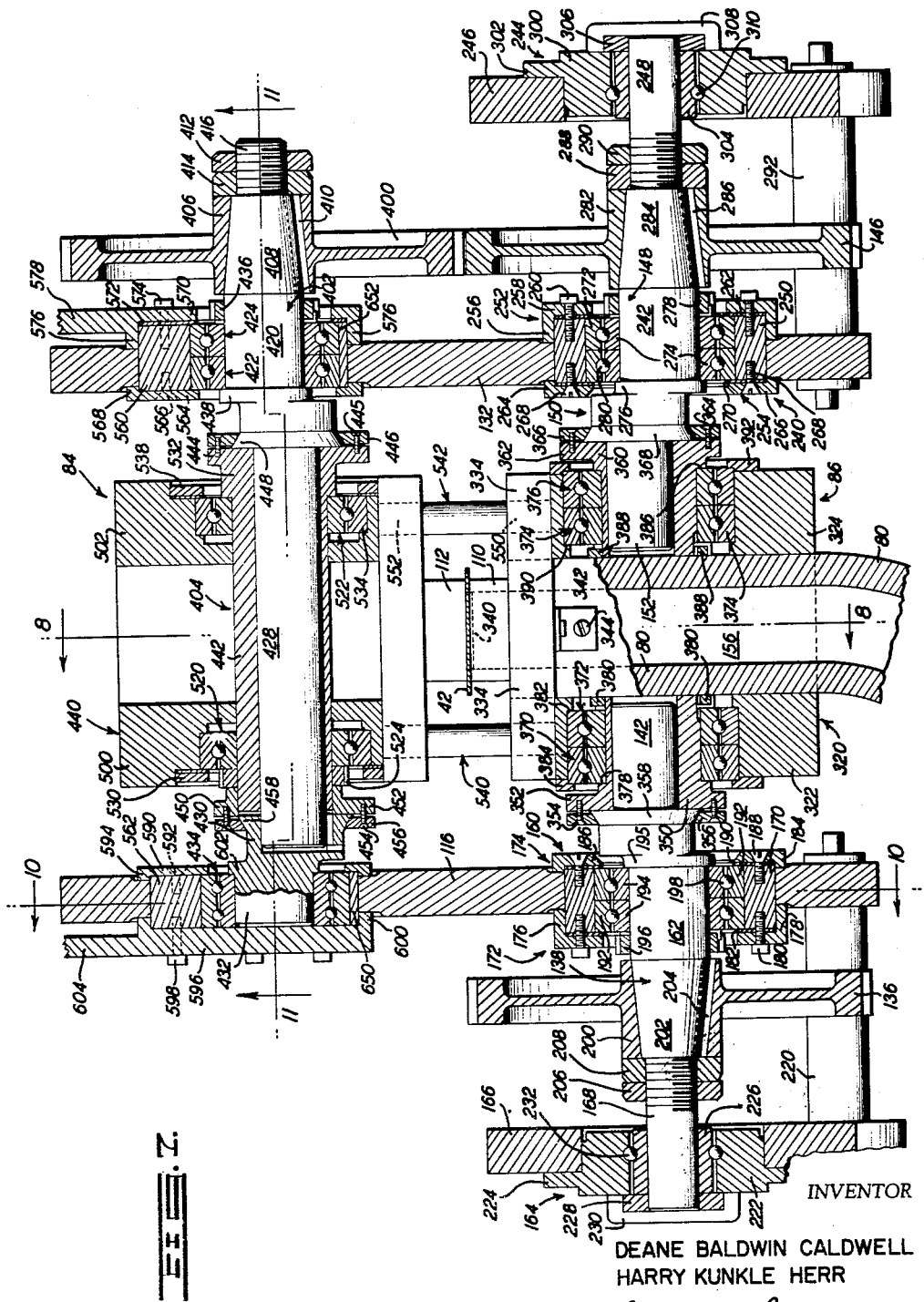

INVENTOR
DEANE BALDWIN CALDWELL
HARRY KUNKLE HERR

BY Glenn and Jackson

ATTORNEY

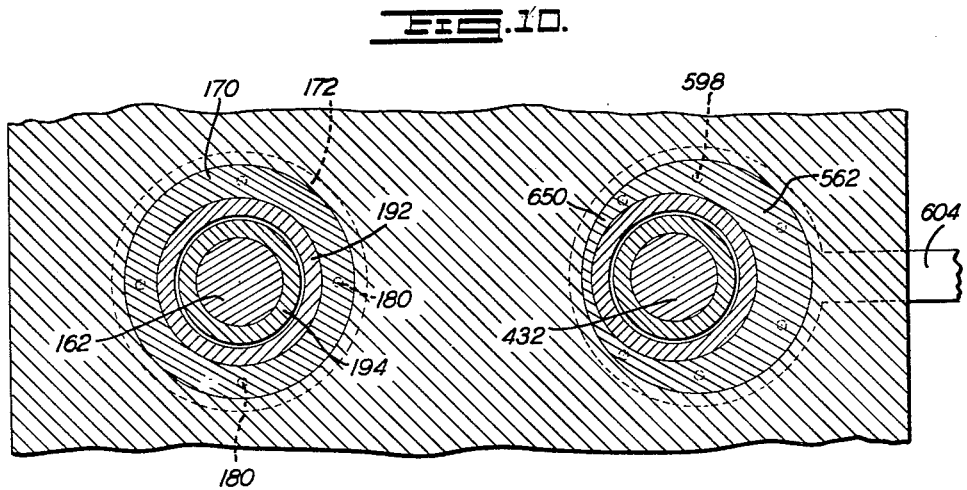
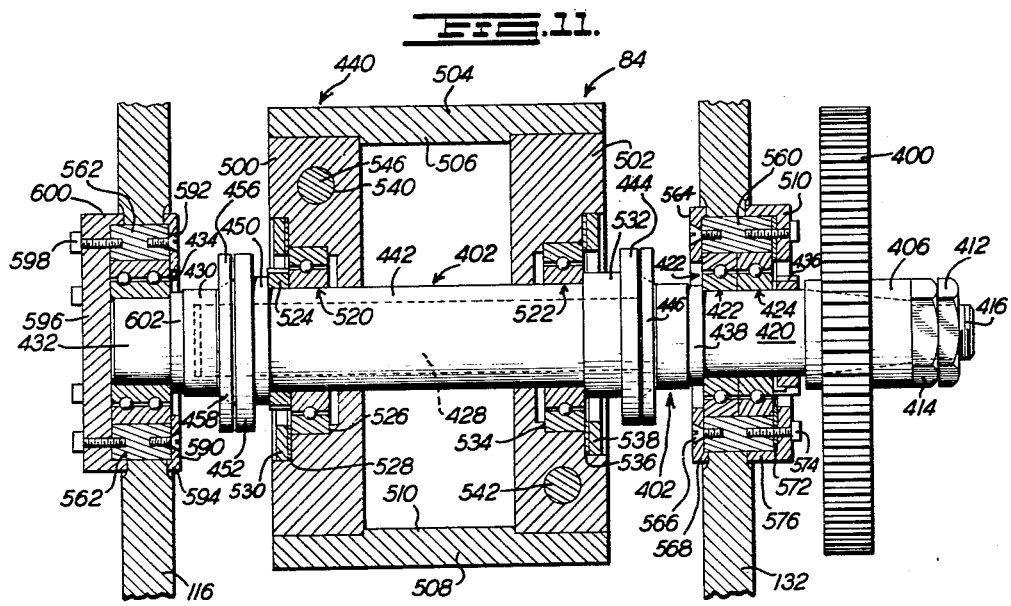

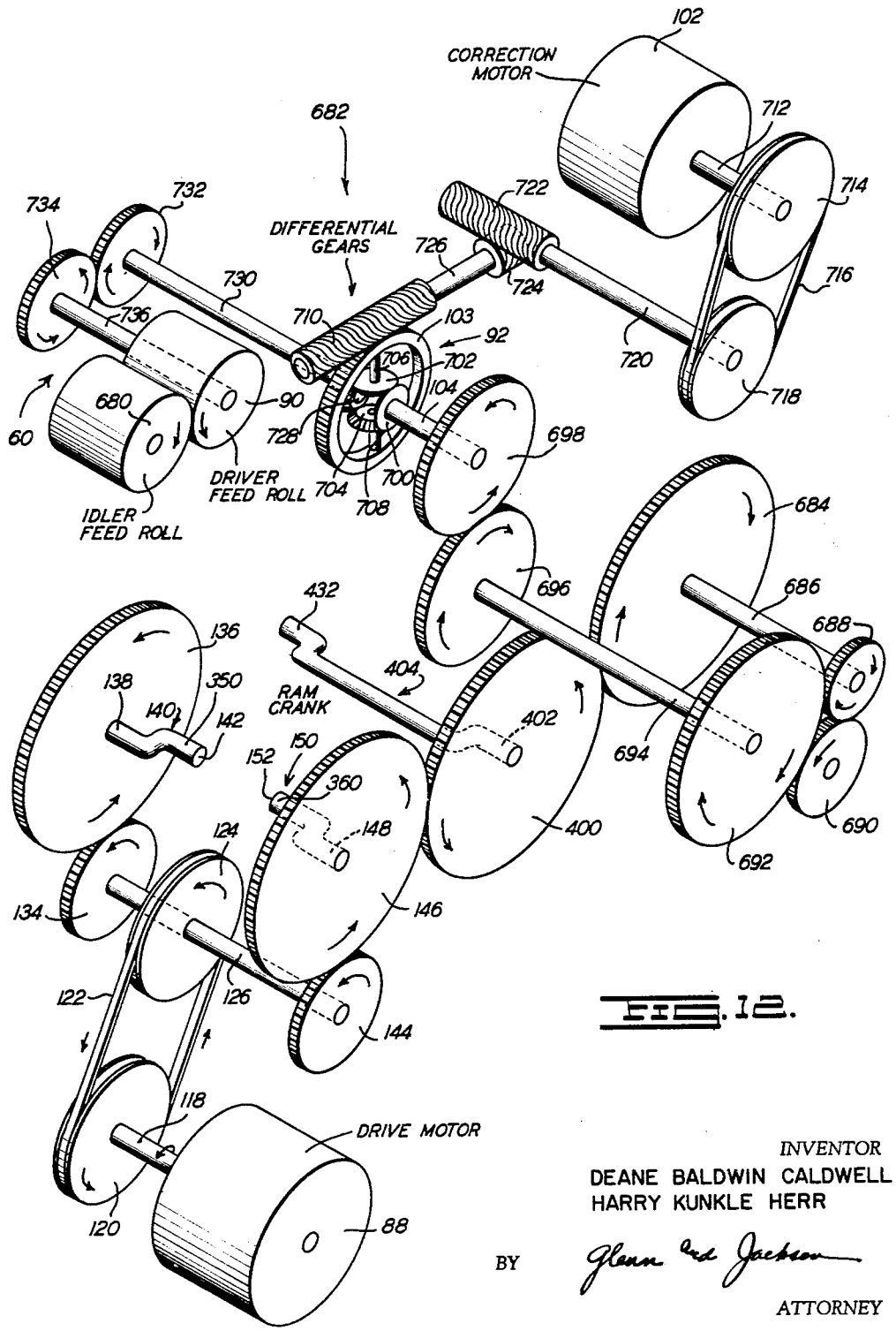

Sept. 22, 1964    D. B. CALDWELL ETAL    3,149,516
MACHINE WITH GUIDE MEANS FOR PRODUCT
Filed April 22, 1960                          9 Sheets-Sheet 9
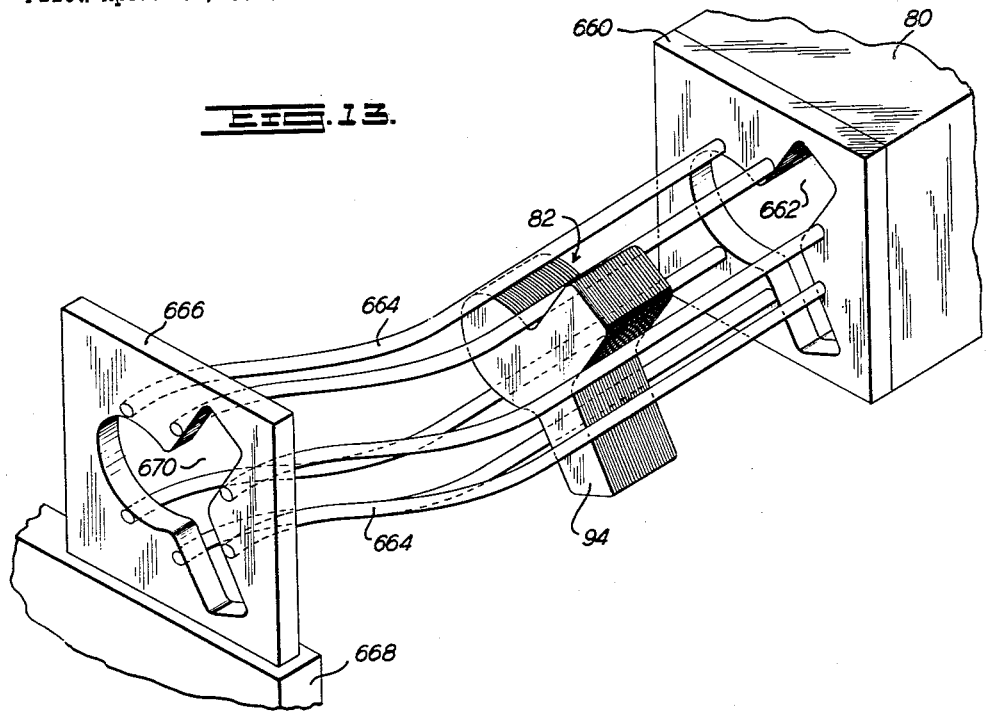
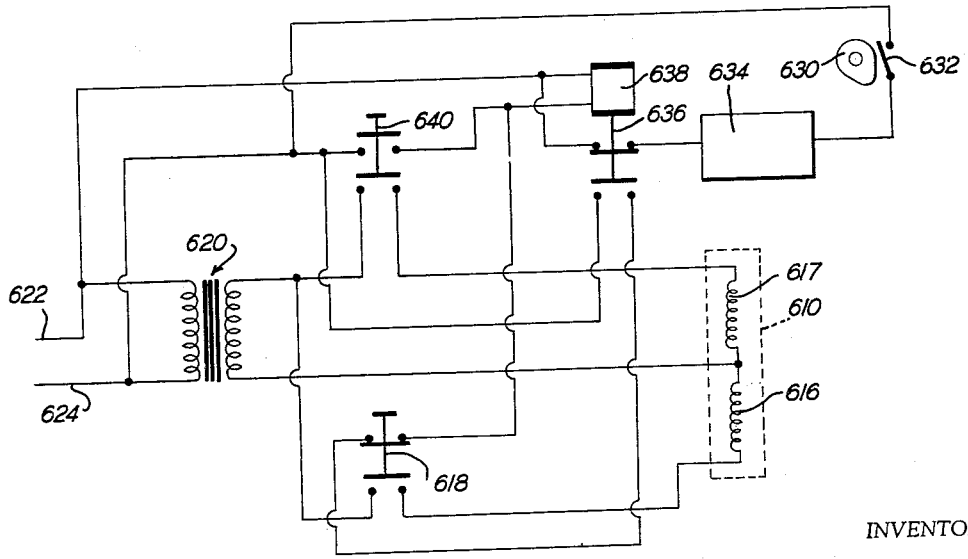
INVENTOR
DEANE BALDWIN CALDWELL
HARRY KUNKLE HERR
BY *Glenn and Jackson*
ATTORNEY

United States Patent Office 3,149,516
Patented Sept. 22, 1964

3,149,516
MACHINE WITH GUIDE MEANS FOR PRODUCT
Deane Baldwin Caldwell, Roslyn Hills, Va., and Harry Kunkle Herr, Louisville, Ky., assignors to Reynolds Metals Company, Richmond, Va., a corporation of Delaware
Filed Apr. 22, 1960, Ser. No. 24,108
8 Claims. (Cl. 83—97)

This invention relates to machines for performing various operations on successive portions of work material rapidly, efficiently, and with decreased wear on the machines. More particularly, this invention provides stable apparatus for uniformly cutting or punching articles from strips of material at high speeds.

Heretofore, some prior machines for punching labels from strips of material have been capable of speeds of about 500 strokes per minute. Some prior machines have been subject to excessive vibration which limited maximum speed and resulted in tearing of the strips and the labels.

The present invention provides a high-speed machine for operating on a succession of portions of work wherein a pair of tools are moved toward and away from each other to engage the work and move in the direction of the work when they contact the work. The tools can perform various operations on the work. Among such operations are: cutting, punching, forming, shaping, curling, notching, shearing, grooving, scoring, and the like.

The present invention further provides a flying, cutting and punching machine of sturdy, balanced construction to reduce vibration. The dynamic balance of the machine allows speeds of about 1,000 strokes per minute to be achieved, with increased efficiency and economy. Further, the machine of the invention is designed to avoid pulling the strip out of its path of travel even though it is being rapidly punched.

The machine of the invention is versatile in that it is constructed so that the stroke of the movable cutting elements can be adjusted for various lengths of pieces to be cut or punched and/or for various thicknesses of strip material. A further advantage is that provision is made for withdrawing the cutting elements from each other to skip cutting at selected lengths of strip, such as defective portions, without stopping the machine. Both cutting elements move toward and away from each other, thus minimizing the time during which the cutting elements contact each other and contact the strip.

The machine of the present invention provides for continuous operation by including an unloading conduit that delivers the cut pieces of material from a rapidly moving die to a stationary receiving station for subsequent packaging and use.

A further advantage of the invention is that the machine includes rolls for drawing a strip with printed outlines thereon, as of bottle labels, and feeding the strip between a punch and die or shears. The rolls are driven by a register control system to maintain the printed outlines in correspondence with cutting elements, such as a punch and die.

The cutting and punching machine of the invention is constructed so that the cutting elements travel along with the strip at approximately the same speed as the strip during the cutting, thus permitting continuous movement of the strip and preventing wrinkling and tearing of the strip and cut pieces. The machine is adaptable to various applications wherein the punched or sheared pieces, or the portion of the strip remaining after punching or shearing, or both, can be employed as the finished products.

For a better understanding of the invention and its other objects, advantages and details, reference is now made to the present preferred embodiment of the invention which is shown, for purposes of illustration only, in the accompanying drawings.

In the drawings:

FIG. 2 is an end elevation of the machine shown in FIG. 1;

FIG. 3 is a fragmentary elevation of the side opposite that shown in FIG. 1;

FIG. 4 is a partial horizontal section on the line 4—4 in FIG. 2;

FIG. 5 is a partial vertical section on the line 5—5 in FIG. 4;

FIG. 6 is a partial vertical section on the line 6—6 in FIG. 5;

FIG. 7 is a horizontal section on the line 7—7 in FIG. 2;

FIG. 10 is a vertical section on the line 10—10 in FIG. 7;

FIG. 11 is a vertical section on the line 11—11 in FIG. 7;

FIG. 12 is a diagrammatic view in perspective of the train of wheels in the machine illustrated in the previous figures.

FIG. 13 is a fragmentary perspective view of the apparatus for delivering the cut labels to a stationary receiving station; and, FIG. 14 is a diagram of an electrical circuit employed in the machine illustrated in the previous figures.

Figure 1:
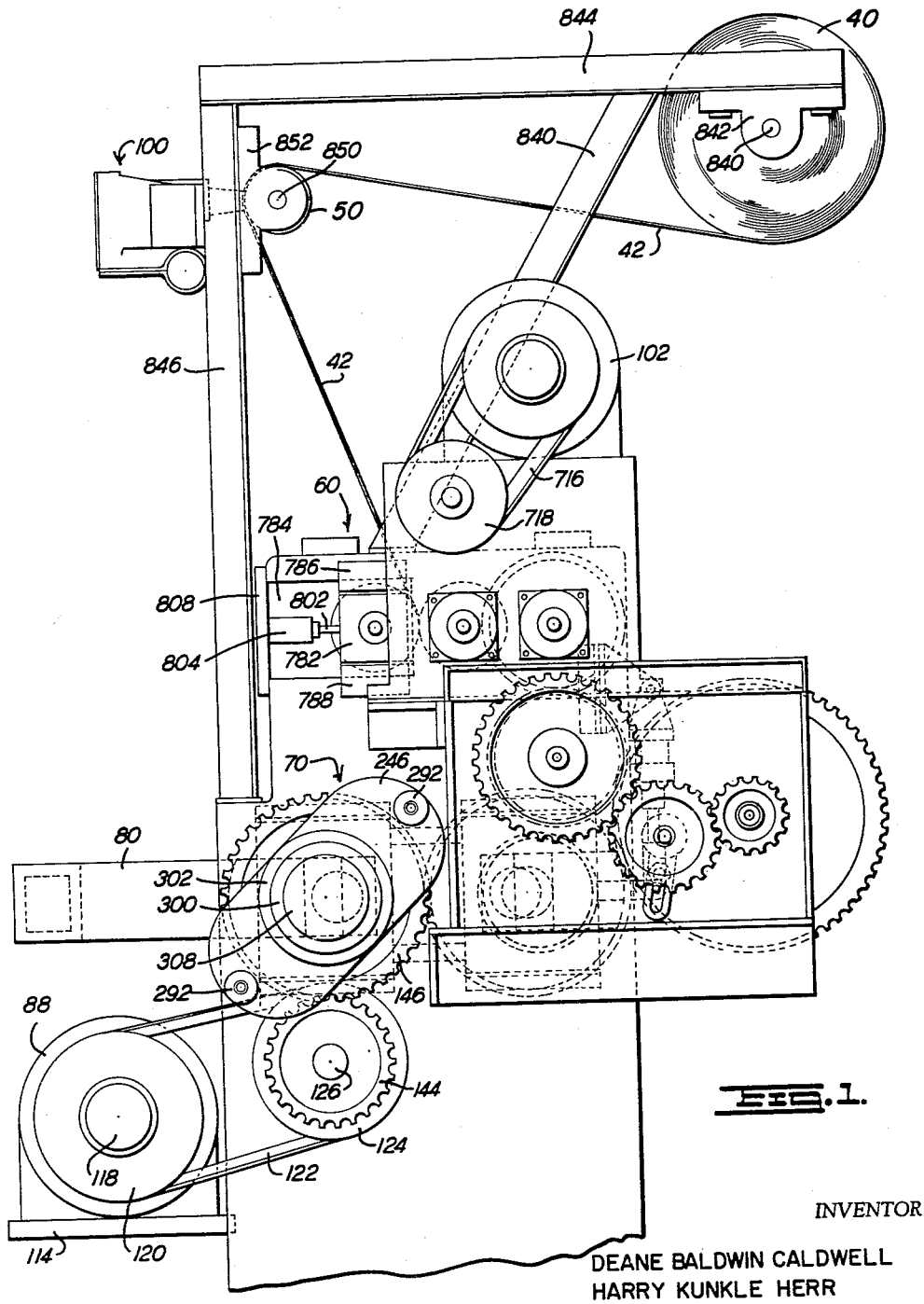
FIG. 1 is a side elevation of a cutting and punching machine according to the invention.

Referring to the drawings, the illustrated cutting and punching machine includes a supply roll 40 wound with a strip 42 of aluminum foil and paper laminate printed with labels for bottles. The strip 42 is led over guide roll 50 and thence down between feed rolls at feed roll assembly 60 positively driven to draw the strip from supply roll 40 and feed the strip to the punching station 70 where a reciprocating punch and die successively punch the bottle labels from the strip. The labels pass through a chute 80 and form stack 82 as seen in FIG. 13 for periodic removal from the machine and subsequent use.

The power for reciprocating the punch assembly 84 and the die assembly 86 is supplied from electric drive motor 88 through a gear train as illustrated in FIG. 12. Power from the electric drive motor 88 is also supplied to drive feed roll 90 of feed roll assembly 60 through a differential gear assembly 92.

Referring to FIG. 2, the strip 42 has printed thereon the outline of labels 94 with register marks 96 at the margin of the strip at the middle of each label. In order that the punched labels shall have the printing properly centered thereon, the strip 42 must move in timed relation with the punch assembly 84 and die assembly 86. Apparatus is provided for maintaining this timed relationship and includes a photoelectric scanner 100 which scans the strip of web 42 for the register marks 96. When the strip 42 is not in proper timed relationship with the punch and die, the scanning head 100 sends an appropriate signal to change the speed of the correction motor 102 driving the ring gear 103 of differential gear assembly 92. This changes the speed of driver feed roll 90 because the speed of this roll is a function of the speeds of shaft 104, and ring gear 103.

A skip-cut assembly is provided for withdrawing, at selected times, punch assembly 84 from the die assembly 86 so that strip 42 will not be punched, without stopping the revolution of the punch and die assemblies.

To accommodate different thicknesses of strip 42 and various shapes and sizes of labels 94, the punch assembly 84 and die assembly are provided with apparatus for adjusting the lengths of their strokes.

Die Assembly, Drive, and Stroke Adjustment

The die 110 and mating punch 112 are revolved synchronously in opposite directions so that the die and punch move in the direction of travel of strip 42 as they punch labels 94 from the strip. This arrangement tends to reduce the possibility of tearing of the labels 94 and the strip 42.

Referring to FIGS. 1 and 12, the power for revolving the punch 112 and die 110 is supplied from an electric drive motor 88 mounted on a base 114 secured to frame side 116, as seen in FIG. 2. The motor 88 drives a shaft 118 having a pulley 120 fast thereto and belted by a belt 122 to a pulley 124 fast to a shaft 126 having one end thereof journaled, referring to FIG. 2, in a bearing 128 mounted in frame side 116, and the opposite end journaled in a bearing 130 mounted in frame side 132. A gear 134 is fast to shaft 126 and meshes with a gear 136 fast to die crankshaft 138 of single die crank 140 having an eccentric crankpin 142 supporting one side of the die assembly 86. Similarly, another gear 144 is fast to shaft 126 and meshes with a gear 146 fast to die crankshaft 148 of single die crank 150 having an eccentric crankpin 152 supporting the other side of the die assembly 86.

The two single cranks 140 and 150 form a split crank support for die assembly 86 whereby a space is provided between the ends of crankpins 142 and 152 to accommodate the chute 80 mounted in die assembly 86 for receiving the cut labels 94 from the die 110 and forming a passage 156 for the movement of the cut labels 94 outwardly from the machine.

To provide adequate support and stable and firm positioning, the crank 140 is provided with two spaced supports. One support is provided by the bearing assembly 160 mounted in frame side 116 and rotatably supporting enlarged cylindrical portion 162 of crankshaft 138. The other support is provided by bearing assembly 164 mounted in outrigger bearing block 166 and rotatably supporting the stub portion 168 of crankshaft 138.

The bearing assembly 160 includes an annular bearing block 170 held in an aperture in frame side 116 by two bearing block retainers 172 and 174 opposing opposite sides of bearing block 170. The bearing block retainer 172 is annular and has an L-shaped cross section formed by a flange 176 and a web 178. Flange 176 engages frame side 116. Screws 180 extend through web 178, a washer 182 and into the bearing block 170. The bearing block retainer 174 is generally annular in shape and has an L-shaped cross section formed by a flange 184 engaging frame side 116 and a web 186 joined by screws 188 to a washer 190 and bearing block 170. A pair of outer bearing races 192 are held between the retainer webs 178 and 186. A pair of inner bearing races 194 are held in position on crankshaft portion 162, between web 195 of crank 140 forming a shoulder and a jam nut 196 surrounding crankshaft portion 162. Balls 198 are rollably positioned in grooves formed in the races 192 and 194.

The gear 136 has a web 200 with a conical bore receiving the frusto-conical portion 202 of crankshaft 138 and keyed thereto by a key 204. The gear 136 is held in position by a pair of nuts 206 and 208 threadedly engaging the stub portion 168 of crankshaft 138.

For stably supporting the crankshaft stub portion 168, the outrigger bearing block 166 is rigidly supported by two posts 220 having inner ends secured to frame side 116 and outer ends secured to block 166. The bearing assembly 164 includes an outer race 222 positioned in an aperture in bearing block 166 and having a flange 224 engaging the outer face of block 166. An inner race 226 surrounds stub shaft 168. A ring 228 surrounds the outer end of stub shaft 168 and engages the outer surfaces of races 222 and 226. A cap 230 holds ring 228 in place and is secured to race 222. A plurality of balls 232 are rotatably positioned in grooves in races 222 and 226.

The single die crank 150 is similarly provided with two spaced supports for stable and firm positioning. One support is provided by a bearing assembly 240 mounted in frame side 132 and rotatably supporting enlarged cylindrical portion 242 of crankshaft 148. The other support is provided by bearing assembly 244 mounted in outrigger bearing block 246 and rotatably supporting the stub shaft 248, which is an integral portion of crankshaft 148.

The bearing assembly 240 includes an annular bearing block 250 held in an aperture in frame side 132 by two bearing block retainers 252 and 254 abutting opposite faces of bearing block 250. The bearing block retainer 252 is annular and has an L-shaped cross section formed by a flange 256 engaging frame side 132, and a web 258 joined by screws 260 to a washer 262 and bearing block 250. The bearing block retainer 254 is generally annular in shape and has an L-shaped cross section formed by a flange 264 engaging frame side 132, section and a web 266 joined by screws 268 to a washer 270 and bearing block 250. A pair of outer bearing races 272 are held between the retainer webs 258 and 266. A pair of inner bearing races 274 are held in position on crank shaft portion 242 between web 276 of crank 150 forming a shoulder and a jam nut 278 surrounding crankshaft portion 242. Balls 280 are rollably received in grooves formed in the races 272 and 274.

The gear 146 has a web 282 with a conical bore receiving the frusto-conical portion 284 of crankshaft 148 and keyed thereto by a key 286. The gear 146 is held in position by a pair of nuts 288 and 290 threadedly engaging the stub shaft 248.

For stably supporting the stub shaft 248, the outrigger bearing block 246 is rigidly supported by two posts 292 having inner ends secured to frame side 132 and outer ends secured to block 246. The bearing assembly 244 includes an outer race 300 received in a hole in bearing block 246 and having a flange 302 engaging the outer face of block 246. An inner race 304 surrounds stub shaft 248. A ring 306 surrounds the outer end of stub shaft 248 and engages the outer surfaces of races 300 and 304. A cap 308 holds ring 306 in place and is secured to race 300. A plurality of balls 310 are rollably received in grooves formed in races 300 and 304.

Figure 8:
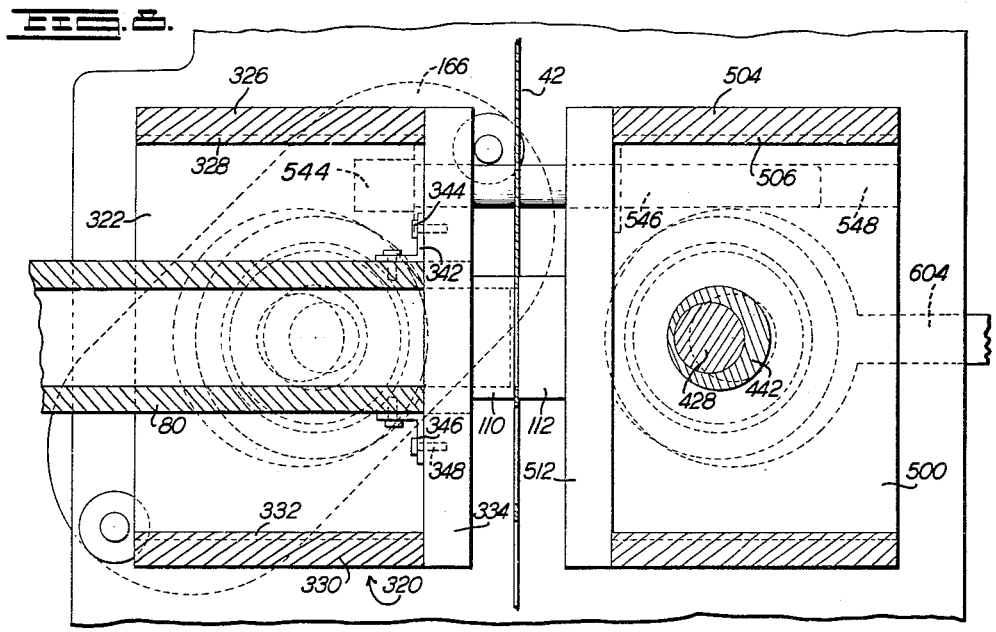
FIG. 8 is a vertical section on the line 8—8 in FIG. 7.
Figure 9:
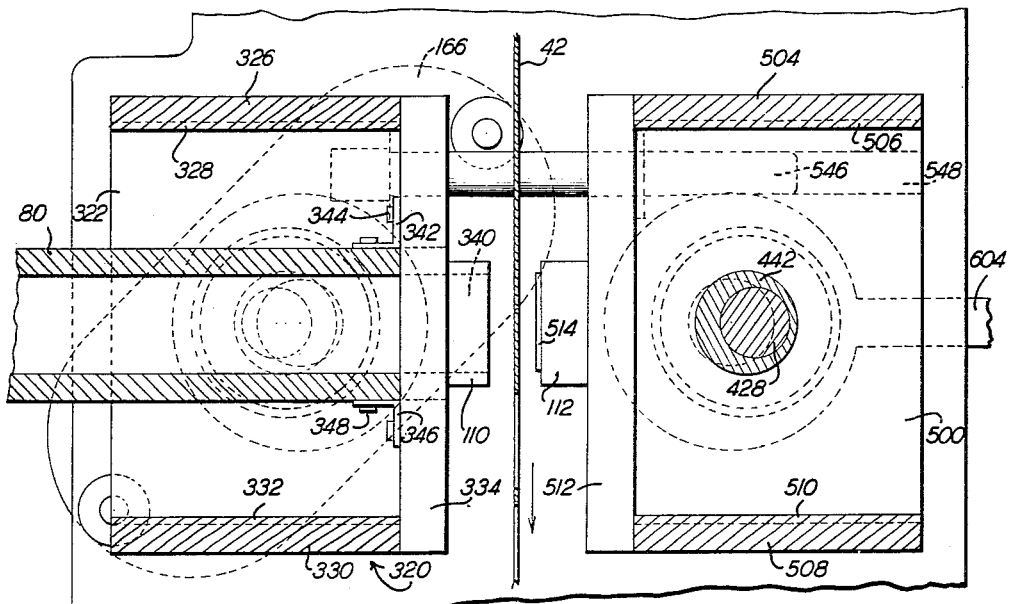
FIG. 9 is a view similar to FIG. 8 but showing the punch and die at the opposite end of their stroke from the position shown in FIG. 8.

Referring to FIGS. 7 to 9, the die assembly 86 is rotatably positioned around crankpins 142 and 152 and includes a die ram 320 formed by a pair of spaced side walls 322 and 324, a top plate 326 secured to the side walls and having an enlarged central portion 328 extending downwardly between side walls 322 and 324, a bottom plate 330 secured to the side walls and having an enlarged central portion 332 extending upwardly between side walls 322 and 324, and a front plate 334 secured to the side walls 322 and 324, the top plate 326 and the bottom plate 332.

The die 110 is removably secured to the front face of front plate 334 and has an aperture 340 formed therein of the shape of the label 94 being punched. The label removal chute 80 is secured to the front plate 336 by an upper angle iron 342 with associated screws or rivets 344 and a lower angle iron 346 with associated screws 348.

Adjustment of the stroke of die ram 320 is provided for varying the movement of die 110 toward punch 112 to accommodate different speeds of movement of strip 42, different thicknesses of strip 42, and various lengths and shapes of the labels 94. The net or resultant eccentricity of the crank 140 is adjusted by an eccentric block or sleeve 350 having an eccentric hole receiving the crankpin 142 and having a flange 352 releasably secured by screws 354 to a clamp ring 356 having a beveled inner surface in pressing mating engagement with the beveled outer surface of crank flange 358. The net eccentricity of crank 140 is changed by loosening screws 354, rotating the eccentric block 350 around crankpin 142 to a desired position, and tightening the screws 354 to clamp the flange 358 between the clamp ring 356 and the eccentric flange 352.

Similarly, the net or resultant eccentricity of the crank 150 is adjusted by an eccentric block or sleeve 360 having an eccentric hole receiving the crankpin 152 and having a flange 362 releasably secured by screws 364 to a clamp ring 366 having a beveled inner surface in pressing mating engagement with the beveled outer surface of crank flange 68. The net eccentricity of crank 150 is changed or adjusted by loosening screws 364, rotating the eccentric block 360 around crankpin 152 to the desired position, and tightening the screws 364 to clamp the crank flange 368 between clamp ring 366 and eccentric flange 362.

Referring to FIG. 7, the eccentric blocks 350 and 360 are adjusted, employing a yoke (not shown), so that their eccentricity is opposed to the eccentricity of crank pins 142 and 152 from their respective crankshafts 138 and 148. Thus, at the adjustment illustrated in FIGURE 7, the net eccentricity of cranks 140 and 150 is least, the resultant stroke of die ram 320 being minimum.

Die ram 320 is rotatably supported on crank eccentric blocks 350 and 360 by four ball bearing assemblies 370, 372, 374, and 376, similar to those previously described. Ball bearing assemblies 370 and 372 have their inner races retained on eccentric block 350 by a block shoulder 378 and a jam nut 380. The outer races of bearing assemblies 370 and 372 are maintained in position in a bore formed in side wall 322 by a shoulder 382 and a retainer ring 384 secured to the side wall 322.

In a similar manner, the ball bearing assemblies 374 and 376 have their inner races retained on eccentric block 360 by a block shoulder 386 and a jam nut 388. The outer races of bearing assemblies 374 and 376 are maintained in position in a bore formed in side wall 324 by a shoulder 390 and a retainer ring 392 secured to the side wall 324.

*Punch Assembly, Drive, and Stroke Adjustment*

Referring to FIGS. 7, 11 and 12, the punch assembly 84 is revolved synchronously with die assembly 86 by gear 490 meshing with gear 146 and fast to crankshaft 402 of double crank 404. The gear 490 has a web 496 with a conical bore receiving a frusto-conical portion 408 of crankshaft 402 and held fixed thereto by a key 410. Gear 400 is releasably held on shaft portion 408 by nuts 412 and 414 threadedly engaging stud 416 extending from shaft portion 408.

Double crank 404 includes a cylindrical crankshaft portion 420 rotatably supported in frame side 132 by ball bearing assemblies 422 and 424; a crank web 426, an eccentric crankpin 428 having one end received in an aperture in web 430 integral with stub crankshaft 432 rotatably supported in frame side 116 by a ball bearing assembly 434. Crankpin 428 is fixed to web 430 by a key 435 for revolving unitarily therewith. The inner races of bearing assemblies 422 and 424 are maintained on the crankshaft cylinder 420 by a jam nut 436 and a collar 438 integral with crankshaft 402.

The double crank 404 has an adjustable eccentricity for adjusting the stroke of punch ram 440 to accommodate various lengths of labels. To provide this adjustable eccentricity, the double crank 404 is provided with an eccentric sleeve 442 an eccentric hole therein receiving the crankpin 428. During operation of the machine, the sleeve 442 is fixed to crankpin 428 and revolves unitarily therewith. The sleeve 442 has a flange 444 secured by screws 445 to a clamp ring 446 having a beveled inner surface in pressing mating engagement with the beveled outer surface of crank flange 448. Thus, the crank flange 448 is clamped between the clamp ring 446 and sleeve flange 444.

An eccentric collar 450 surrounds the left end of sleeve 442, as seen in FIG. 7, and has a flange 452 secured by screws 454 to a clamp ring 456 having a beveled inner surface in pressing mating engagement with the beveled outer surface of crank flange 458. Thus, the crank flange 458 is clamped between eccentric collar 450 and clamp ring 456.

At the adjustment illustrated in FIG. 7, the crank 402 has minimum net eccentricity because the eccentricity of sleeve 442 opposes the eccentricity of crankpin 428 from crankshaft 402. The resultant stroke of punch ram 440 is minimum. The net eccentricity of double crank 402 is adjusted by loosening screws 445 and 454, turning the eccentric sleeve 442 and the eccentric collar 450 to the desired new position, and tightening the screws 445 and 454.

Referring to FIGS. 7 to 11, the punch ram 440 includes a pair of side walls 500 and 502, a top plate 504 secured to the side walls and having an enlarged central portion 506 extending downwardly between side walls 500 and 502, a bottom plate 508 secured to the side walls and having an enlarged central portion 510 extending upwardly between the side walls, and a front plate 512 secured to the side walls, the top plate and the bottom plate. The punch 112 is removably secured to the front surface of front plate 512 and has an extension 514 with a shape of a label 94 to fit within the aperture 340 of die 110.

The punch ram 440 is rotatably supported on crank sleeve 442 by a pair of ball bearing assemblies 520 and 522. The ball bearing assembly 520 has its inner race positioned on sleeve 442 by a jam nut 524 abutting collar 450, and its outer race positioned in an offset in side wall 500 by a shoulder 526 and a washer 528 and a retaining ring 530 secured to side wall 500.

Similarly, the ball bearing assembly 522 has its inner race abutting annular collar 532 integral with sleeve 442, and its outer race abutting shoulder 534 of side wall 502 and clamped by a washer 536 and retaining ring 538 secured to side wall 502.

*Guide Pin Alignment of Die Ram and Punch Ram*

So that the punch extension 514 will enter the die aperture 340 on each stroke and be maintained parallel and aligned therewith, referring to FIGS. 7 to 11, two guide pins 540 and 542 are provided for maintaining the die ram 320 and punch ram 440 aligned during their revolving motion. The guide pins are positioned at diagonally-opposite corners of the rams. Guide pin 540 has one end 544 enlarged and anchored in die ram side wall 322, referring to FIGS. 8 and 9, and the opposite end 546 slidably received in a cylindrical hole or bearing 548 formed in punch ram side wall 500.

The guide pin 542 has a similar structure and includes one end 550 anchored in die ram side wall 324 and the opposite end 552 slidably received in a hole or bearing formed in punch ram side wall 502. The punch and die travel at approximately the speed of strip 42 at the time punching occurs without interrupting the continuous speed of strip 42.

*Skip Cut and Control Thereof*

A skip cut assembly is provided so that the punch ram 440 can be withdrawn away from die ram 320, while the machine is running, so that punching of strip 42 will not occur during desired intervals, as when defective portions of strip 42 are passing the punch. For this purpose, referring to FIGS. 7, 10 and 11, the bearing assemblies 422 and 424, supporting the cranskshaft 402, are mounted in eccentric bearing block 560 rotatably received in a hole in frame side 132; and the bearing assembly 434, supporting the stub crankshaft 432, is mounted in an eccentric bearing block 562 rotatably received in a hole in frame side 116.

To retain the block 560 in the hole in frame side 132, and to retain the outer races of bearing assemblies 422 and 424 in the eccentric bore in block 560, a retainer plate 564 is secured to block 560 by screws 566 and abuts the outer race of bearing assembly 422. The plate 564 has an outer flange 568 abutting the periphery of block 560 and received in a groove formed in frame side 132.

A retainer plate 570 engages a washer 572 abutting the opposite end of block 560 and secured thereto by screws 574. The washer 572 and plate 570 abut the outer race of bearing assembly 424. The plate 570 has a flange 576 abutting the periphery of block 560 and received in a groove formed in frame side 132. A control arm 578 is integral with plate 576 and extends therefrom adjacent side wall 132 for actuation as described hereinafter.

For retaining the eccentric bearing block 562 in the hole in frame side 116, and retaining the outer race of bearing assembly 434 in the bore in block 562, a retainer plate 590 is secured to the block 562 by screws 592 and has its inner portion abutting the outer race of bearing assembly 434. A flange 594 is formed at the outer edge of plate 590 and abuts the periphery of block 562 and is received in a groove formed in frame side 116.

An outer retaining plate 596 is secured to the opposite side of block 562 by screws 598 and has a flange 600 abutting the periphery of block 562 and received in a groove formed in frame side 116. The plate 596 abuts both the inner and outer races of ball bearing assembly 434. The collar 602 on stub shaft 432 also buts the inner race of ball bearing assembly 434. A control arm 604 is integral with plate 596 and extends therefrom parallel to frame side 116 for actuation as described hereinafter.

The skip cut assembly is actuated by a rod 606 connecting the outer ends of control arms 578 and 604 so as to rotate the arms unitarily. A link 608 has its lower end connected to rod 606 and its upper end connected to a piston movable in a pneumatic cylinder of air motor 610 pivotally suspended from pin 612 secured to brackets 614 mounted on the frame of the machine.

Referring to FIG. 14, the air motor 610 has its valve reversed by an electrical impulse through coil 616 when the circuit therethrough is closed by actuation of switch 618 receiving power from a transformer 620 having its primary coil energized by power voltage across leads 622 and 624.

With continued reference to FIG. 14, a stroke counting cam 630 is mounted on one of the split cranks 140 or 150 for closing switch 632 upon each revolution and closing the circuit through stroke counter 634 interruptable by armature 636 of relay 638 energized by closing switch 640. The closing of switch 640 causes the circuit through stroke counter 634 to be interrupted during skip-cut periods so that counter 634 accurately counts cut labels. Switch 640 also closes the circuit through coil 617 for reversing the valve in air motor 610.

Referring to FIGS. 7, 8, and 10, the skip cut assembly is located so that thin part 650 of eccentric block 562 and the thin part 652 of eccentric block 560 are located closest to die assembly 86, whereby the punch crankshafts 402 and 432 are located closest to the die assembly and the punch extension 514 punches a label 94 from strip 42 upon each revolution of the cranks. It will be seen that rotation of arms 604 and 578 will rotate the blocks 562 and 560 to withdraw the punch crankshafts 402 and 432 away from the die assembly 86. The withdrawal is not so great as to disengage gears 146 and 400.

Unloading Labels

Referring to FIGS. 3 and 13, chute 80 revolves with die assembly 86. The stack 82 illustrates a portion of the continuous stream of labels 94 passing through the chute 80. To provide for unloading the cut labels, the extreme end plate 660 of the chute has an aperture 662 formed therein having the shape of the label 94. Flexible connector elements 664 form a flexible conduit for the labels and extend from end plate 660 at spaced positions around the aperture 662 to a receiver plate 666 secured to panel 668 of the machine frame and having an aperture 670 formed therein having the shape of the cut labels 94. The flexible connectors 664 are secured to positions on receiver plate 666 around the periphery of aperture 670, whereby the labels in stack 82 are maintained oriented during their movement through the flexible conduit. The connectors 664 can be formed of various materials, such as nylon, wire, and the like.

The labels are removed through aperture 670 for subsequent packaging and use.

Feed Rolls and Controlled Driving Therefor To Maintain Register

The strip 42 is drawn through the machine by feed roll assembly 60 including driver feed roll 90 and idler feed roll 680 rotating at a speed which is a function both of the speed of correction motor 102 and punch gear 400. That is, the speed of correction motor 102 and punch gear 400 combine in differential gear assembly 92 to produce the resultant speed of driver feed roll 90.

The differential gear assembly 92 and correction motor 102 are part of a control system generally designated by numeral 682 for continuously maintaining register between the outlines of labels 94 on the strip 42 and punch extension 514 and die aperture 340 so that the punch will strike in register with the label outlines on the strip stock. Among the components which can be employed in the control system is General Electric Company Photoelectric Two-Way Cutoff-Register Control System CR 7515–W210 which compares electronically a register-mark signal obtained from scanning head 100, General Electric CR 7515–P202, and a die position signal obtained from a CR 7515–P145 selector switch (not shown) attached to die crank 140, and employes any resulting error signal to change field current of a pilot generator (not shown) which supplies the power that drives the correction motor 102. Since the pilot generator is driven from the machine at a speed which is proportional to the speed of drive motor 88, the system compensates automatically for variations in machine speed.

The correction motor 102 runs in one direction only and errors are corrected by changing the speed from the preset value or based speed. The actual motor speed may be either higher or lower than its selected base value; thus two-way operation is obtained without reversing the motor.

Normally, the strip 42 is fed into the machine at a speed which is slightly higher than the speed required. The proper rate of feed is then obtained by so selecting the base (no-error) speed of the correction motor 102 that it acts through differential gear assembly 92 to reduce the overfeed until the strip 42 and the punch and die are in register.

The system corrects continuously for any deviation in position between the label imprints 94 and strip 42 and the punch and die by either increasing or decreasing the correction motor 102 speed from its base value, thus feeding the strip 42 slower or faster to keep the strip 42 and the punch and die in correspondence.

Referring to FIG. 12, the input to differential gear assembly 92 from drive motor 88 is supplied from gear 400 meshing with gear 684 fast to shaft 686 having a gear 688 fast thereto and meshing with idler gear 690 meshing with gear 692 fast to shaft 694 having a gear 696 fast thereto meshing with gear 698 fast to shaft 104 having a differential bevel gear 700 fast thereto. Bevel gear 700 meshes with bevel gears 702 and 704 rotatably supported on stub shafts 706 and 708, respectively, fixed to ring gear 103 meshing with worm gear 710.

The correction motor 102 drives differential ring gear 103 through a shaft 712 having a pulley 714 fast thereto and belted by belt 716 to a pulley 718 fast to shaft 720 integral with a worm 722 meshing with gear 724 fast to shaft 726 having the worm gear 710 integral therewith.

With continued reference to FIG. 12, the driven bevel gear 728 meshes with bevel gears 702 and 704 of the differential and is fast to shaft 730 having a gear 732 fast thereto meshing with gear 734 fast to shaft 736 having feed roll 90 fast thereto.

Referring to FIGS. 4, 5 and 6, the driver feed roll 90 includes a frame 750 made fast to shaft 736 by set screws 752 and 754 and a rubber sleeve 756 surrounding the shank 758 of the frame 750. The shaft 736 has one end 760 rotatably supported in frame side 116 by a ball bearing assembly 762 retained in frame side 116 by retainer ring 764 secured to the frame side. The opposite portion 766 of shaft 736 is rotatably supported in frame side 132 by ball bearing assemblies 768 retained by retainer ring 770 secured to frame side 132 and jam nut 772 mounted on shaft portion 766.

With continued reference to FIGS. 4, 5 and 6, the idler feed roll is fixed to shaft 774 by set screws 776 and 778. It is desirable to provide for pressing the rolls 680 and 90 toward each other firmly to grip the strip 42. For this purpose, the shaft 774 has its opposite ends rotatably supported in bearing blocks 780 and 782 slidably mounted in the frame sides 116 and 132, respectively. The bearing block 782 is slidably received in a slot 784 formed in frame side 132 and maintained therein by upper retaining plates 786 and lower retaining plates 788 secured by screws 790 to frame side 132. The shaft end 792 is rotatably supported in a bore in bearing block 782 by a ball bearing assembly 794 having its outer races retained by rings 796 and 798 secured to block 782 and its inner races retained on shaft end 792 by jam nut 800.

The bearing block 782 is pressed toward shaft 736 by piston rod 802 secured thereto and connected to a piston movable in pneumatic cylinder 804 having a base plate 806 secured to panel 808 closing the slot 784 and secured by bolts 809 to frame side 132. A strut 810 extends between the frame sides and is secured thereto by bolts 811.

The opposite end 812 of shaft 774 is rotatably supported in bearing block 780 by a ball bearing assembly 814 retained by ring 816 secured to block 780. The block 780 is slidably supported in a slot 818 and maintained therein by upper retaining plates 820, referring to FIG. 3, and lower retaining plates 822 secured to frame side 116. The bearing block 780 is pressed toward shaft 736 by piston rod 824 connected to a piston movable in pneumatic cylinder 826 having a base plate 828 secured to panel 830 closing the slot 818 and secured by bolts 832 to frame side 116.

Referring to FIGS. 1 to 3, the supply roll 40 has its shaft 840 journaled in bearings 842 secured to horizontal frame members 844 secured to the upper ends of vertical frame members 846 and buttressed by diagonal members 848. The guide roll 40 has its shaft 850 journaled in bearings 852 secured to vertical frame members 846. The scanning head 100 is mounted on vertical frame members 846 so as to be directed toward strip 42 at the point where it turns on guide roll 40.

*Machine Operation*

There will now be described the operation of the illustrated embodiment of the invention.

A roll of paper and aluminum foil laminate printed with a series of label outlines 94 is suspended from bearing blocks 842. The strip 42 is led from the coil around guide roll 40, downwardly between rolls 90 and 680 of feed roll assembly 60, and thence downwardly between the punch 112 and die 110.

The strip 94 may have various outlines imprinted thereon or may not be printed. The portions punched from the strip can be the finished product or, in other applications of the machine, the portion of the strip remaining after punching can be the finished product. There might also be applications of the machine wherein both the punched pieces and the portion of the strip remaining after punching would be desired products.

With the strip 42 fed into the machine, a punch 112 and die 110 are inserted in their respective rams having shapes corresponding to the shape of labels 94 imprinted on strip 42. The stroke of the punch ram 440 and die ram 320 is adjusted to correspond to the length of the label 94 and the thickness of strip 42. This is accomplished for the die by rotating the eccentric blocks 350 and 360 on their respective crankpins 142 and 152 with the screws 354 and 364 loose. Eccentric block 350 is fixed in the desired position by tightening screws 354 so as to clamp crank flange 358 between clamp ring 356 and eccentric block 350. Similarly, eccentric block 360 is adjusted, with the screws 364 loose. With the block in the desired position, the screws 364 are tightened so as to clamp crank flange 368 between the clamp ring 366 and the block 360.

The stroke adjustment for the punch is accomplished by loosening screws 445 and 454, rotating eccentric sleeve 442 and eccentric collar 450 to the desired position, and tightening screws 445 and 454 to clamp the flange 448 between the clamp ring 446 and the collar 532 of sleeve 442. The flange 458 is clamped between collar flange 452 and clamp ring 456. Thus, the sleeve 442 and the crankpin 428 are locked together for unitary revolving.

Next, the strip 42 is moved to align a label outline 94 with the adjacent punch 112 and die 110. The drive motor 88 is then started to revolve die cranks 140 and 150 through the train of pulley 120, belt 122, pulley 124, gears 134, driving gear 136, and gear 144 driving gear 146. The punch crank 404 is similarly revolved by gear 400 meshing with gear 146.

The die ram 320 revolves with the die cranks, being rotatably supported on the crank eccentric blocks 350 and 360. The punch ram 440 similarly revolves with the punch crank 404, being rotatably supported on sleeve 442. The die ram 320 and punch ram 440 are maintained parallel and aligned by the guide pins 540 and 542.

Because of the meshing of gears 400 and 146, the die ram 320 and punch ram 440 revolve in opposite directions so that punch extension 514 enters die aperture 340 and punches or shears a label 94 upon each revolution.

With reference to FIG. 13, the cut labels 94 pass through the chute 80 which revolves unitarily with the die ram 320. The stream of labels passes outwardly through aperture 662 and through the flexible conduit formed by the flexible connectors 664 to the plate 666 fast to the machine frame portion 668. The stream of labels, part of which is indicated by the reference numeral 82 in FIG. 13, passes through the aperture 670 in plate 666 for packaging and subsequent use.

The register of the labels 94 outlined on strip 42 with the punch and die is maintained by the control system 682, diagrammatically shown in FIG. 12. The scanning head 100 views the marks 96 on the strip 42 and sends a signal to a control panel such as General Electric CR 7515–W210, which compares this signal with another signal obtained from a CR 7515–P145 selector switch and generates any resulting error signal which changes the field current of a pilot generator supplying power to correction motor 102. The resulting change in speed of correction motor 102 is transmitted through pulleys 714 and 718 and gears 722, 724, and 710 as an input to ring gear 103 of differential gear assembly 92. The differential has another input to bevel gear 700 from drive motor 88 through the gears as illustrated in FIG. 12. The speed change of motor 102 thus produces change in speed of driven gear 728 of differential gear assembly 92 driving driver feed roll 90 of feed roll assembly 60 through gears 732 and 734. In this manner, the register of the label outlines imprinted on strip 42 is maintained.

FIGS. 8 and 9 disclose the punch 112 and die 110 at opposite ends of the stroke. FIG. 8 illustrates the portion of the cycle wherein the punch is mating with the die 110 to punch a label from strip 42. When the shearing or cutting occurs, the punch and die are moving along with the strip 42 at approximately the same speed as the strip. This tends to prevent tearing of the labels and the strip and wrinkling of the labels and permits the strip 42 to move continuously.

FIG. 9 illustrates the position of punch and die at a position 180 degrees removed from the position shown in FIG. 8, that is, at the opposite end of the stroke. It will be seen that the punch and die move away from the strip at equal speeds after shearing. The punch and die thus exert an approximately equal and opposite pulling on the strip due to sticking or adhesion effects. This results in approximately a zero net pulling force on the sheet so that the strip or sheet 42 is not pulled out of its path of movement.

The opposite turning of die ram 320 and punch ram 440, combined with the balanced construction of the machine, produces a dynamic balance causing reduced vibration of the machine and permitting increased speed of operation. Machines according to the invention can be operated at 1000 strokes per minute, thus producing 1000 labels per minute.

When it is desired to skip punching because, for example, there is a defect in the strip 42, the switch 618 is actuated to close the circuit through coils 616 actuating a valve in air motor 610, referring to FIGS. 14, 7, 10, and 11. The actuation of air motor 610 moves link 608, FIG. 3, to raise rod 606 and rotate control arms 578 and 604 fixed to eccentric blocks 560 and 562. The rotation moves the thicker portions of blocks 560 and 562 in front of the crank shafts 402 and 432, that is, moves these thicker parts toward the die assembly 86. The punch crankshafts 402 and 432 are thus moved away from the die assembly 86, so that the punch ram 440 with its punch 112 is withdrawn from the die assembly 86.

When it is desired to return the punch to shearing position, the electrical circuitry is reversed by actuating switch 640 to energize coil 617 and reverse air motor 610, thereby driving link 608 downwardly to rotate the control arms 578 and 604. The eccentric blocks 560 and 562 are thus rotated to the position shown in FIG. 7 wherein the small portions 650 and 652 of the bearing blocks are closest to the drive assembly 86 and the crank shafts 402 and 432 are closest to the die assembly 86.

The various movements of punch 112 and its ram 440 are dependent on three eccentricities. Firstly, the eccentricity of crankpin 428 from its crank shafts 402 and 432. Secondly, the eccentricity of sleeve 442. Thirdly, the eccentricity of bearing blocks 560 and 562 for withdrawing the punch so that it will not encounter the strip 42 even though the machine is constantly running.

Referring to FIGS. 4 to 6, the strip 42 is positively driven at the peripheral speed of drive rolls 90 and 680 particularly because the shaft 774 is pressed toward the driver feed roll 90 by pneumatic cylinders 826 and 804, thus causing the roll 680 to press the strip 42 against the periphery of driver feed roll 90.

Thus it will be seen that the invention provides a machine for performing operations on successive portions of work, that is of balanced construction, capable of high speed operation, readily adjustable to accommodate different jobs, is maintained in register with work being operated upon, and can be actuated to skip operating during desired intervals.

While a present preferred embodiment of the invention has been illustrated and described, it will be recognized that the invention can be otherwise variously embodied and practiced within the scope of the following claims.

We claim:

1. A machine for cutting and punching comprising a frame; a pair of single die cranks each rotatably supported in said frame, said single die cranks having crank pins spaced from each other; said crank pins being substantially coaxial; a die ram rotatably supported around said crank pins and having an aperture extending from the front portion thereof between the ends of said crank pins and through the rear of said die ram; a chute located in said aperture for receiving cut pieces and for the transmission thereof; a punch crank having shaft portions rotatably journaled in said frame; a punch ram rotatably supported on the crankpin of said punch crank; said punch crank shaft portions being on opposite sides of said punch ram, said punch crank shaft portions being substantially coaxial; guide pins maintaining said punch ram and die ram aligned during revolution thereof; a punch secured to said punch ram; a die secured to said die ram; and, eccentric means for selectively withdrawing said punch crank shaft portions away from said die cranks for indeterminate periods to prevent engagement of said punch and die during the selected periods of withdrawal.

2. In a machine for cutting and punching pieces from strip material and including a frame, a punch ram and a die ram mounted for revolution at opposed positions; means for revolving said punch and die rams to move toward and away from each other; a punch on said punch ram and a die on said die ram; the improvement which comprises said die ram having an aperture extending therethrough from the die to the rear of said die ram; a chute mounted in said aperture and extending outwardly from said ram for the passage of cut pieces of material; said chute having an end with an aperture formed therein for the removal of cut pieces of material; a receiver plate mounted stationarily with respect to said frame; said receiver plate having an aperture formed therein for the passage of punched pieces of material; a plurality of flexible connectors extending from spaced positions around the aperture in said chute end to spaced positions around the aperture in said receiver plate.

3. The invention as set forth in claim 2 wherein said flexible connectors form a passage of the shape of the punched pieces of material, said flexible connectors being spaced around the periphery of the passage to maintain the punched pieces of material oriented during travel through the passage.

4. A machine for cutting and punching previously-outlined pieces from a strip of material comprising a frame including a pair of spaced sides; a punch double crank having its ends rotatably supported in said spaced sides; said punch crank having crankshafts, a crankpin eccentric to said crankshafts, and webs connecting said crankpin to said crankshafts; a sleeve surrounding said crankpin, said sleeve having an eccentric bore formed therein receiving said crankpin, means releasably connecting said sleeve to said punch crankpin for rotation unitarily therewith; a punch ram having a transverse bore extending therethrough, said punch crank sleeve being received in said ram bore and rotatably supporting said punch ram; a punch secured to said punch ram; a pair of single die cranks each having a crankshaft rotatably supported in one of said frame sides; each said single crank having a crankpin eccentric to a crankshaft, a web connecting said crankpin to said crankshaft, a sleeve having an eccentric bore therein receiving the die crankpin, and means releasably connecting said die sleeve to said die crankpin; said die ram having transverse apertures formed therein receiving the die crank sleeves; a die secured to said die ram; a machine prime mover for rotating said die cranks and said punch crank synchronously in opposite directions; a pair of feed rolls for feeding said strip material between said punch and die; at least one of said feed rolls being positively driven; a differential gear assembly having an output gear driving said driven feed roll, said differential gear assembly having two input gears being driven at speeds to determine the speed of said output gear; one of said input gears being driven through a gear train from the machine prime mover; the other input gear being driven by a photoelectric register control system at a speed varied in accordance with the error of alignment of the outlines on the strip with the punch and die.

5. A machine for cutting, punching and the like comprising a pair of cutting elements; cranks rotatably carrying each said cutting element for revolving said cutting elements to move said cutting elements toward and away from each other; each of said cranks including a crankshaft, a crankpin eccentric to said crankshaft and connected thereto by a web, and a sleeve surrounding said crankpin, said sleeve having an eccentric bore formed therein receiving said crankpin; a clamp ring around said crankpin and having a beveled surface, said crankpin having a beveled flange formed thereon and mating with the beveled surface of said clamp ring; detachable connectors for connecting said clamp ring to said sleeve to clamp the crank flange between said clamp ring and said sleeve; said machine including a machine frame; said crankshafts being rotatably supported in bearings received in said frame; eccentric support means for rotatably supporting said bearings in said frame; and means for selectively rotatably moving said eccentric support means to radially withdraw the bearings of the crankshafts of one cutting element away from the other for indeterminate periods without stopping continuous revolving of said cranks to skip cutting during the periods of withdrawal.

6. A machine for cutting pieces of strip material, said machine including a stationary frame; a die movable relative to said frame to cut pieces of material during a cutting cycle; said die having an aperture of a given configuration; a plurality of flexible connectors attached at one of their respective ends to said die at points surrounding and adjacent said aperture so as to move with said die, the opposite ends of said flexible connectors being connected stationarily with respect to said frame; said flexible connectors defining a conduit having a cross section substantially the same as said given configuration of said aperture whereby the cut pieces of material discharged through said die aperture are maintained in stacked relation within said flexible connectors.

7. A machine for cutting pieces from strip material, said machine including a stationary frame; a die assembly movable relative to said frame to cut pieces of material during a cutting cycle, said die assembly having an aperture substantially of the shape of pieces to be cut and through which the cut pieces pass; means defining a flexible conduit having a transverse cross section substantially the same as said aperture, said flexible conduit being connected at one of its ends to said die assembly substantially in registry with said aperture to receive cut pieces of material discharged through said aperture, the other end of said flexible conduit being connected stationarily with respect to said frame.

8. A machine for punching strip material comprising a punch assembly and a die assembly mounted for revolution at opposed positions; a punch crank having two opposite crankshafts, one crankshaft on each side of said punch assembly, said opposite punch crankshafts being substantially coaxial, said punch crank including an eccentric crankpin connected by webs to said punch crankshafts, said punch crankpin extending through said punch assembly; two single die cranks, each single die crank including a die crankshaft, an eccentric die crankpin corresponding to each die crankshaft, and a web connecting each die crankpin to its respective die crankshaft, said die crankpins extending into opposite sides of said die assembly, said die crankshafts being substantially coaxial; a die carried by said die assembly; said die assembly having an aperture therein substantially of the shape of the pieces to be cut and through which the cut pieces pass; means defining a flexible conduit having a transverse cross section substantially the same as said aperture, said flexible conduit being connected at one of its ends to said die assembly substantially in registry with said aperture to receive cut pieces of material discharged through said aperture, the other end of said flexible conduit being connected stationarily with respect to said frame.

References Cited in the file of this patent
UNITED STATES PATENTS

| | | |
|---|---|---|
| 1,304,034 | Edwards | May 20, 1919 |
| 1,852,722 | Novick | Apr. 5, 1932 |
| 2,208,350 | Ungar | July 16, 1940 |
| 2,258,070 | Sawle | Oct. 7, 1941 |
| 2,320,659 | Sahlin | June 1, 1943 |
| 2,369,253 | Robinson | Feb. 13, 1945 |
| 2,406,808 | Conner | Sept. 3, 1946 |
| 2,564,354 | Conner | Aug. 14, 1951 |
| 2,599,430 | Beuerman | June 3, 1952 |
| 2,640,539 | Piper | June 2, 1953 |
| 2,642,937 | Hallden | June 23, 1953 |
| 2,865,450 | Sarka | Dec. 23, 1958 |
| 2,990,047 | Hendrickson | June 27, 1961 |
| 2,995,968 | Tomberg | Aug. 15, 1961 |